United States Patent
Ghobrial et al.

(10) Patent No.: US 7,593,494 B1
(45) Date of Patent: Sep. 22, 2009

(54) SYSTEM AND METHOD FOR CANCELING IMPULSE NOISE

(75) Inventors: Ayman Ghobrial, Huntsville, AL (US); Michael D. Turner, Huntsville, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 753 days.

(21) Appl. No.: 10/948,492

(22) Filed: Sep. 23, 2004

(51) Int. Cl.
*H04B 1/10* (2006.01)
(52) U.S. Cl. .................................. 375/350; 375/347
(58) Field of Classification Search ................. 375/346, 375/350
See application file for complete search history.

(56) References Cited

U.S. PATENT DOCUMENTS

| | | | |
|---|---|---|---|
| 3,374,435 A | | 3/1968 | Engel |
| 3,825,843 A | | 7/1974 | Felsberg et al. |
| 4,339,754 A | * | 7/1982 | Hammers et al. ............. 342/89 |
| 4,527,261 A | | 7/1985 | Smither |
| 4,587,620 A | | 5/1986 | Niimi et al. |
| 4,914,398 A | | 4/1990 | Jove et al. |
| 4,982,428 A | * | 1/1991 | Agazzi et al. .......... 379/406.08 |
| 5,410,264 A | | 4/1995 | Lechleider |
| 5,902,249 A | * | 5/1999 | Lyster ........................ 600/509 |
| 6,052,420 A | | 4/2000 | Yeap et al. |
| 6,546,057 B1 | | 4/2003 | Yeap |
| 6,683,855 B1 | | 1/2004 | Bordogna et al. |
| 2003/0118088 A1 | | 6/2003 | Tzannes et al. |
| 2005/0053229 A1 | | 3/2005 | Tsatsanis et al. |

OTHER PUBLICATIONS

U.S. Appl. No. 10/460,968 entitled "Echo-Canceler For Precoded Fractionally Spaced Receiver Using Signal Estimator," filed Jun. 13, 2003.
J.W. Lechleider, "An Adaptive Impulse Noise Canceler for Digital Subscriber Lines," Global Telecommunications Conference, 1992.
U.S. Appl. No. 11/373,841, entitled "Adaptive Interference Canceling System and Method," filed Mar. 11, 2006.
Odling, et al., "An Approach to Analog Mitigation of RFI," IEEE Journal on Selected Areas in Communications, vol. 20, No. 5, Jun. 2002.
Yeap, et al., "A Novel Common-Mode Noise Cancellation Technique for VDSL Applications," IEEE Transactions on Instrumentation and Measurement, vol. 52, No. 4, Aug. 2003.

* cited by examiner

*Primary Examiner*—Shuwang Liu
*Assistant Examiner*—Michael R Neff
(74) *Attorney, Agent, or Firm*—Lanier Ford Shaver & Payne, P.C.

(57) ABSTRACT

A system for canceling impulse noise comprises an adaptive impulse canceler and a combiner. The adaptive impulse canceler is configured to receive a common mode component of a received signal and to detect a noise impulse in the common mode component. The impulse canceler is further configured to provide, based on the noise impulse in the common mode component, an impulse noise estimation for a differential mode component of the received signal. The combiner is configured to receive the differential mode component and the impulse noise estimation and to subtract the impulse noise estimation from the differential mode component.

15 Claims, 9 Drawing Sheets

ND METHOD FOR CANCELING
IMPULSE NOISE

RELATED ART

Noise on a telecommunication line corrupts signal quality and limits the overall speed at which data can be successfully communicated over the telecommunication line. One type of noise, referred to as "impulse noise," is characterized by high amplitude levels of short duration. Due to the high amplitude levels associated with impulse noise, data bits corrupted by a burst of impulse noise cannot normally be recovered merely using common filtering techniques.

Error correcting coding techniques have been used to recover data bits corrupted by impulse noise. In error correcting coding, data to be transmitted to a remote receiver is encoded into code words. Each code word includes data bits and redundant error correcting bits. If a data bit of a particular code word is corrupted during transmission, then the code word's error correcting bits can be used at the receiver to recover the corrupted bit. However, depending on the number of error correcting bits appended to each code word, the number of data bits that can be recovered from each code word is typically limited. In this regard, if too many bits of the same code word are corrupted, then the code word's corrupted bits are unrecoverable.

An occurrence of a noise impulse on a telecommunication line often corrupts a successive string of bits communicated over the telecommunication line. Thus, if the bits of the same code word are successively transmitted over the telecommunication line, a single noise impulse could easily corrupt a sufficient number of the code word's bits such that recovery of the corrupted bits is impossible using error correcting coding.

In an effort to reduce the impact of impulse noise, the data bits of the code words transmitted along a telecommunication line may be interleaved such that each bit from the same code word is separated by at least one bit from a different code word. As a result, the effects of a single noise impulse is spread over multiple code words thereby increasing the likelihood that all of the corrupted data bits can be recovered using error correcting coding. Indeed, the more code words that are interleaved together, the greater the likelihood that error correcting coding can be used to recover all of the data bits corrupted by a single noise impulse.

However, increasing the number of code words that are interleaved together has the adverse effect of increasing delay. In this regard, the receiver must usually wait until all of the bits of a code word are received before error correcting coding can be used to recover corrupted bits within the code word. Thus, significant trade-offs exist between data reliability and speed when selecting the level of interleaving to be performed with error correcting coding.

In an effort to avoid the delays associated with error correcting coding, attempts have been made to estimate and cancel impulse noise by subtracting impulse noise estimates from received signals. Such approaches introduce significantly less delay as compared to error correcting coding. However, the shapes of different noise impulses are often different, and it is usually impossible to predict when an impulse noise of a particular shape will be present on a telecommunication line. Thus, accurately estimating the impulse noise on a telecommunication line at any given instant is difficult and problematic. As a result, current solutions that attempt to compensate for impulse noise by estimating and cancelling noise impulses are typically plagued by performance problems.

SUMMARY OF THE DISCLOSURE

Generally, embodiments of the present invention provide systems and methods for canceling impulse noise.

A system for canceling impulse noise in one exemplary embodiment of the present disclosure comprises an adaptive impulse canceler and a combiner. The adaptive impulse canceler is configured to receive a common mode component of a received signal and to detect a noise impulse in the common mode component. The impulse canceler is further configured to provide, based on the noise impulse in the common mode component, an impulse noise estimation for a differential mode component of the received signal. The combiner is configured to receive the differential mode component and the impulse noise estimation and to subtract the impulse noise estimation from the differential mode component.

A method for adaptively canceling impulse noise in one exemplary embodiment of the present disclosure comprises the steps of: detecting a noise impulse in a common mode component of a received signal; estimating a noise impulse in a differential mode component of the received signal based on the detected noise impulse thereby providing an estimate of the noise impulse in the differential mode component; and substantially canceling the noise impulse in the differential mode component based on the estimate.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Embodiments of the present disclosure generally pertain to systems and methods for cancelling impulse noise from signals communicated over telecommunication lines. A system in accordance with one exemplary embodiment of the present disclosure detects various noise impulses within the common mode components of signals transmitted over a telecommunication line. For each of a plurality of different noise impulses, the system learns a transfer function that, based on the shape of the noise impulse in the common mode component of a signal, provides an estimate of the shape of the noise impulse in the differential mode component of the signal. Thereafter, when the system detects a similar noise impulse in the common mode component of a signal, the system uses the previously learned transfer function to provide an estimate of the noise impulse in the differential mode component of the signal. The system then subtracts the estimate from the differential mode component of the signal thereby substantially cancelling the noise impulse from the differential mode component and providing a differential mode signal that is substantially free of the noise impulse.

Figure 1:
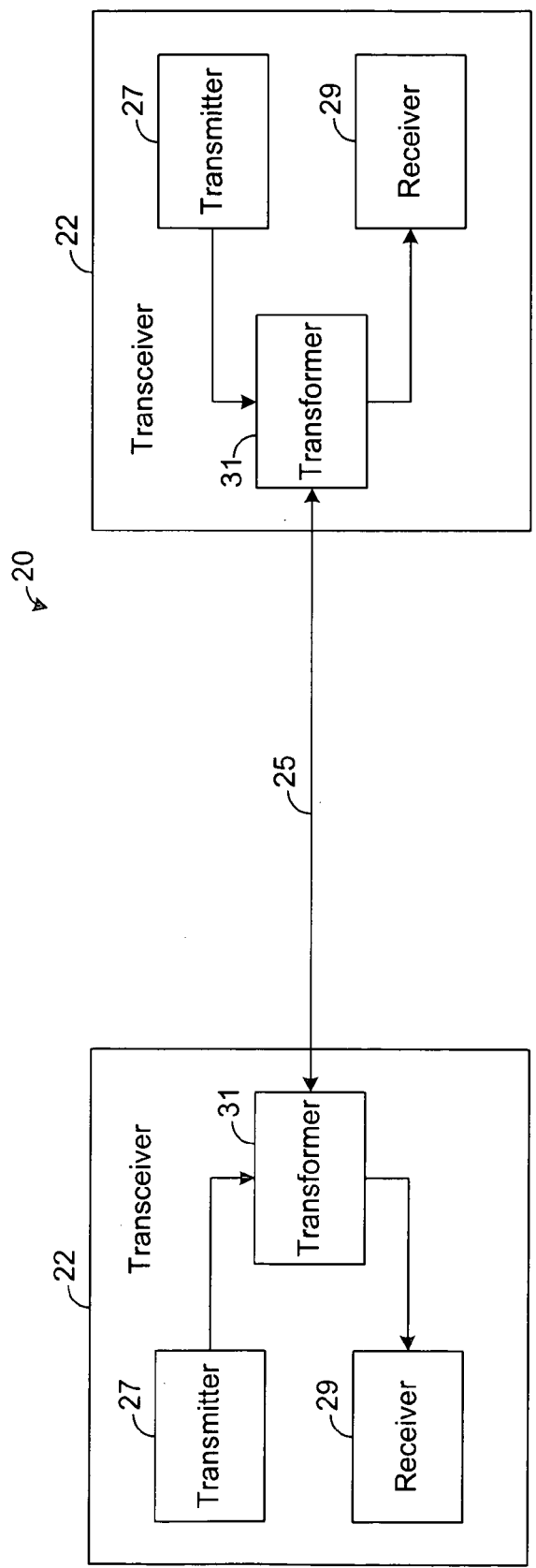
FIG. 1 is a block diagram illustrating an exemplary communication system in accordance with one embodiment of the present disclosure.

FIG. 1 depicts a communication system 20 in accordance with an exemplary embodiment of the present disclosure. The system 20 comprises a pair of transceivers 22 that communicate with one another over a telecommunication line 25. As a mere example, one of the transceivers 22 may be located at a central office of a telecommunication network, and the other transceiver 22 may reside at a customer premises that is serviced by the central office. In one embodiment, the telecommunication line 25 comprises a pair of conductive connections, such as a pair of copper connections sometimes referred to as a "twisted pair."

Each of the transceivers 22 comprises a transmitter 27 for transmitting data signals over the telecommunication line 25 and a receiver 29 for receiving data signals from the telecommunication line 25. As an example, each of the transceivers 22 may be implemented as an xDSL (x-digital subscriber line) transceiver, such as HDSL, HDSL2, SDSL, etc., although other types of transceivers are possible in other examples. As shown by FIG. 1, each of the transceivers 22 comprises a transformer 31 that couples the transceiver's transmitter 27 and receiver 29 to the telecommunication line 25.

Figure 2:
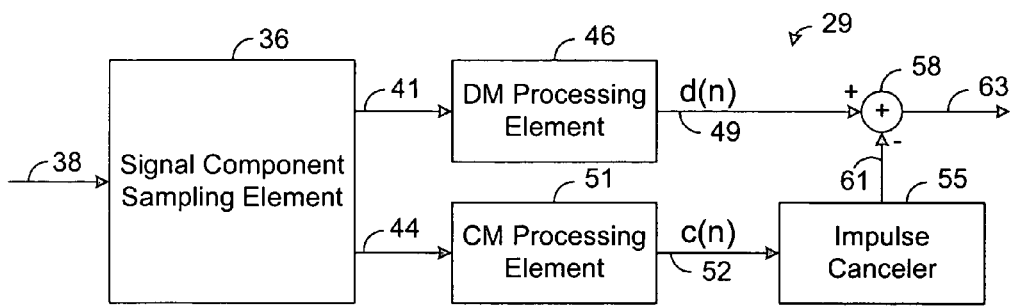
FIG. 2 is a block diagram illustrating an exemplary embodiment of a receiver depicted in FIG. 1.

FIG. 2 depicts an exemplary embodiment of the receiver 29 for one of the transceivers 22. As shown by FIG. 2, the receiver 29 comprises a signal component sampling element 36 that receives a data signal 38 from the telecommunication line 25 (FIG. 1). The signal component sampling element 36 separately outputs the differential mode component 41 of the received signal 38 and the common mode component 44 of the received signal 38.

A differential mode (DM) processing element 46 processes the differential mode component 41 to provide a processed differential mode signal 49, d(n). The shaping and filtering performed by the DM processing element 46 is similar to shaping and filtering performed by conventional transceivers when processing a received signal.

A common mode (CM) processing element 51 processes the common mode component 44 to provide a processed common mode signal 52, c(n). The shaping and filtering performed by the CM processing element 51 is similar to shaping and filtering performed by conventional transceivers when processing a received signal. Note that when the data signal 38 contains a noise impulse, the noise impulse appears in both the differential mode component 41 and the common mode component 44. However, the noise impulse is typically more pronounced in the common mode component 44.

An impulse canceler 55 receives the common mode signal 52 and detects whether the signal 52 includes a noise impulse. If so, the impulse canceler 55 identifies the shape of the noise impulse and, based on the identified shape, estimates the shape of the same noise impulse in the differential mode signal 49. The impulse canceler 55 then provides a cancellation signal 61 that, when subtracted from the differential mode signal 49 by a signal combiner 58, substantially removes the noise impulse from the signal 49 to provide a differential mode signal 63 that is substantially free of the detected noise impulse.

Figure 3:
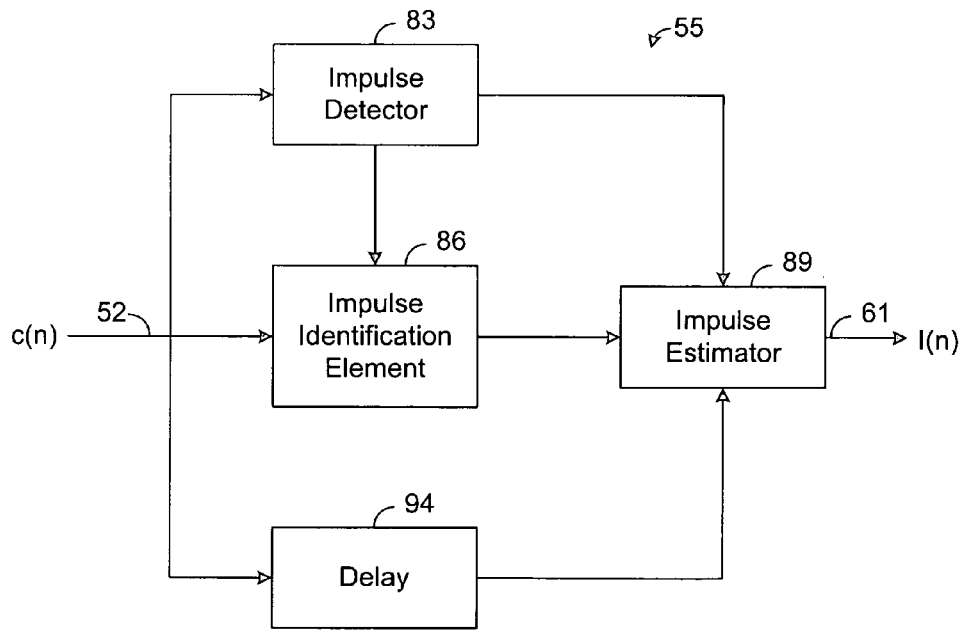
FIG. 3 is a block diagram illustrating an exemplary embodiment of an impulse canceler depicted in FIG. 2.

FIG. 3 depicts a more detailed view of the impulse canceler 55 for one exemplary embodiment of the present disclosure. As shown by FIG. 3, the impulse canceler 55 comprises an impulse detector 83 that detects noise impulses within the common mode signal 52. In one embodiment, the impulse detector 83 detects a noise impulse by detecting when the amplitude of the common mode signal 52 exceeds a specified threshold. When a noise impulse is detected, the impulse detector 83 informs an impulse identification element 86 and an impulse estimator 89.

The impulse identification element 86 stores data identifying a plurality of possible noise impulse shapes. For each of the stored impulse shapes, the impulse estimator 89 learns a transfer function for converting a noise impulse of the same shape from common mode to differential mode.

Moreover, when the impulse detector 83 detects a noise impulse, the impulse identification element 86 identifies the shape of the impulse. The impulse estimator 89 then applies the transfer function corresponding with the identified shape to the detected noise impulse such that the impulse estimator 89 converts the detected noise impulse from common mode to differential mode. Note that the converted impulse represents an estimation, I(n), of the same noise impulse in the differential mode signal 49 (FIG. 2), and the impulse canceler 55 transmits the converted impulse to the combiner 58 as signal 61 at the appropriate time such that the combiner 58, by subtracting the cancellation signal 61 from the differential mode signal 49, substantially removes the noise impulse from the differential mode signal 49.

As shown by FIG. 3, a delay mechanism 94 delays the common mode signal 52 a suitable amount of time such that the appropriate transfer function can be selected by the impulse estimator 89 and applied to the noise impulse. In this regard, the delay introduced by the delay mechanism 94 provides the impulse detector 83 and the impulse identification element 86 with sufficient time to, respectively, detect and identify the noise impulse before the impulse estimator 89 receives the impulse and applies the selected transfer function to the impulse.

Figure 4:
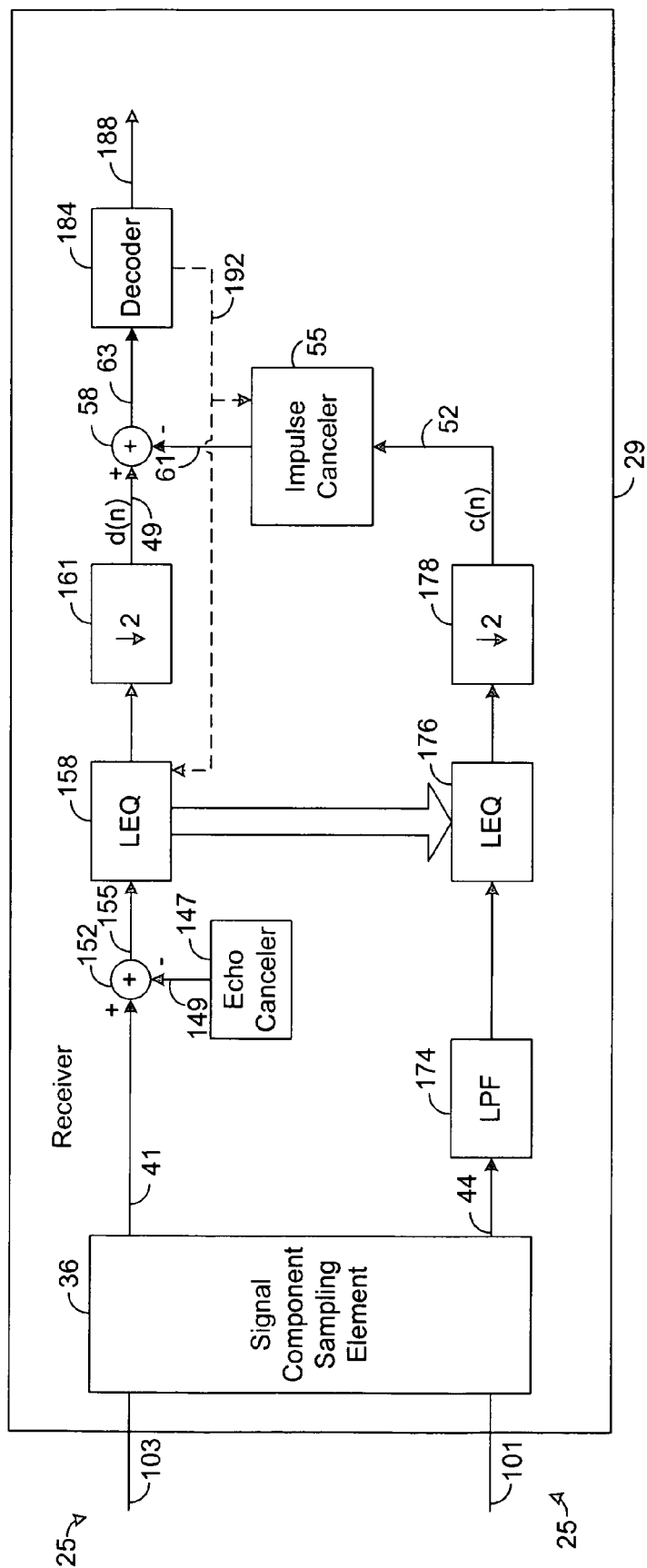
FIG. 4 is a block diagram illustrating an exemplary embodiment of the receiver depicted in FIGS. 1 and 2.
Figure 5:
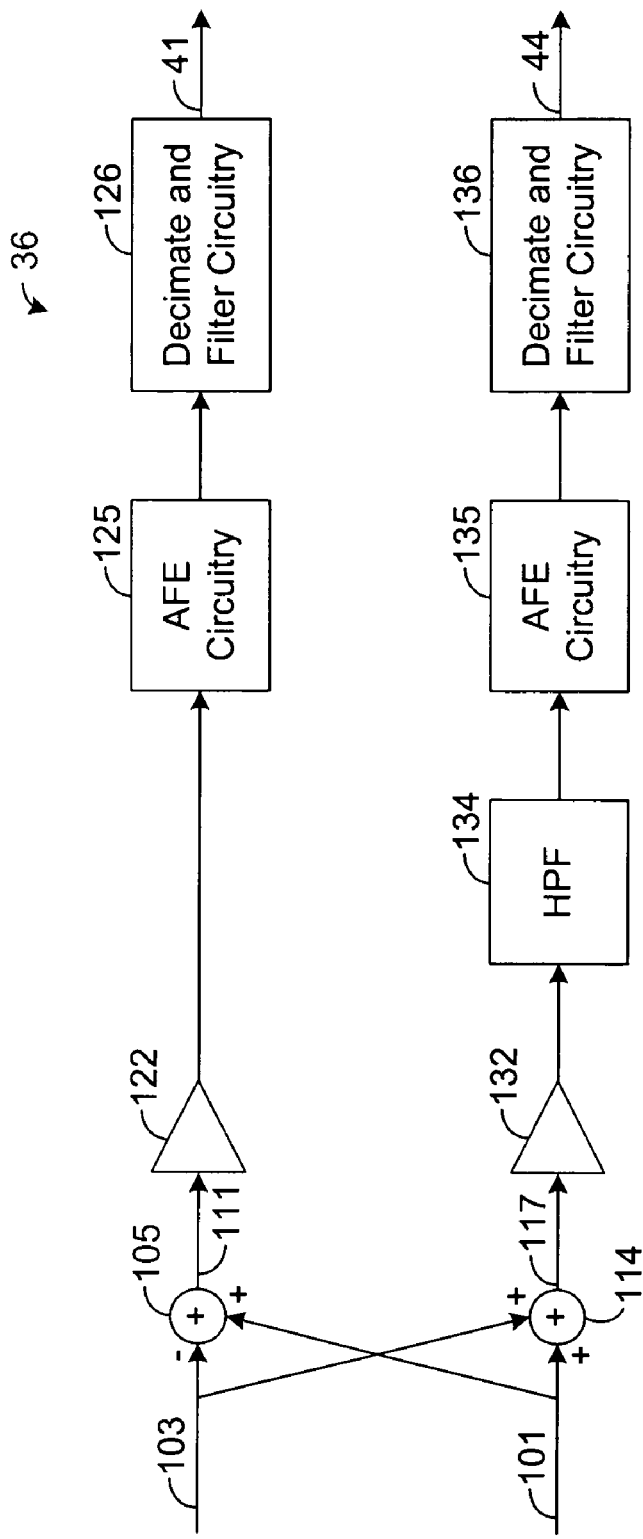
FIG. 5 is a block diagram illustrating an exemplary embodiment of a signal component sampling element depicted in FIG. 4.

FIG. 4 depicts an exemplary receiver 29 in accordance with one embodiment of the present disclosure. As shown by FIG. 4, the component sampling element 36 is coupled to a pair of communication connections 101 and 103, respectively referred to as "tip" and "ring," of telecommunication line 25. FIG. 5 depicts a more detailed view of the component sampling element 36. As shown by FIG. 5, a combiner 105 subtracts the voltage of ring 103 from the voltage of tip 101 in order to provide a differential mode signal 111, and a combiner 114 adds the voltages of tip 101 and ring 103 in order to provide a common mode signal 117.

The differential mode signal 111 is amplified by amplifier 122 and then passes through analog front end (AFE) circuitry 125 and decimate and filter circuitry 126. The AFE circuitry 125 converts the amplified signal from analog to digital. The circuitry 126 then decimates and filters the digital signal to provide the differential mode signal 41.

The common mode signal 117 is amplified by amplifier 132 and then passes through a high-pass (HPF) filter 134, analog front end (AFE) circuitry 135, and decimate and filter circuitry 136. The high-pass filter 134 filters low frequency noise from the amplified signal, and the AFE circuitry 135 converts the filtered signal from analog to digital. The circuitry 136 then decimates and filters the digital signal to provide the common mode signal 44.

Referring again to FIG. 4, when echo canceled transmission is employed, a combiner 152 subtracts an echo cancellation signal 149 from the differential mode signal 41 in order to substantially cancel echoes from the signal 41, thereby providing a signal 155 that is substantially free of echoes. In addition, a linear equalizer 158 adaptively filters the signal 155 in an effort to reduce noise and enhance signal quality. Depending on the equalizer sampling rate, optional downsample circuitry 161 may downsample the filtered signal from the linear equalizer 158. The linear equalizer 158 or the downsample circuitry 161, if present, outputs the differential mode signal 49 that is received by combiner 58.

In a common mode path, the common mode signal 44 is filtered by a low-pass filter (LPF) 174 to remove high frequency noise from the signal 44. A linear equalizer 176 adaptively filters the signal filtered by the low-pass filter 174 in an effort to remove noise and enhance signal quality. In the example shown by FIG. 4, the linear equalizer 176 of the common mode path uses the same filter coefficients as the linear equalizer 158 of the differential mode path. Optional downsample circuitry 178 may downsample the filtered signal from the linear equalizer 178 by the same factor as the downsample circuitry 161, if present.

As described above, the impulse canceler 55 detects and identifies a noise impulse in the common mode signal 52. The impulse canceler 55 then estimates the shape of the impulse in the differential mode and outputs, as signal 61, the estimated differential mode impulse. The combiner 58 subtracts the estimated differential mode impulse from the differential mode signal 49 in order to remove the noise impulse from the signal 49 to provide a differential mode signal 63 that is substantially free of impulse noise.

A decoder 184 decodes the signal 63 in order to provide a decoded differential mode signal 188. A feedback signal 192 indicative of the error detected by the decoder 184 is used by the linear equalizer 158 to update its coefficients and, as will be described in more detail hereinbelow, is used by the impulse canceler 55 to adaptively adjust coefficients that are used to estimate the differential mode impulses output from the impulse canceler 55.

Figure 6:
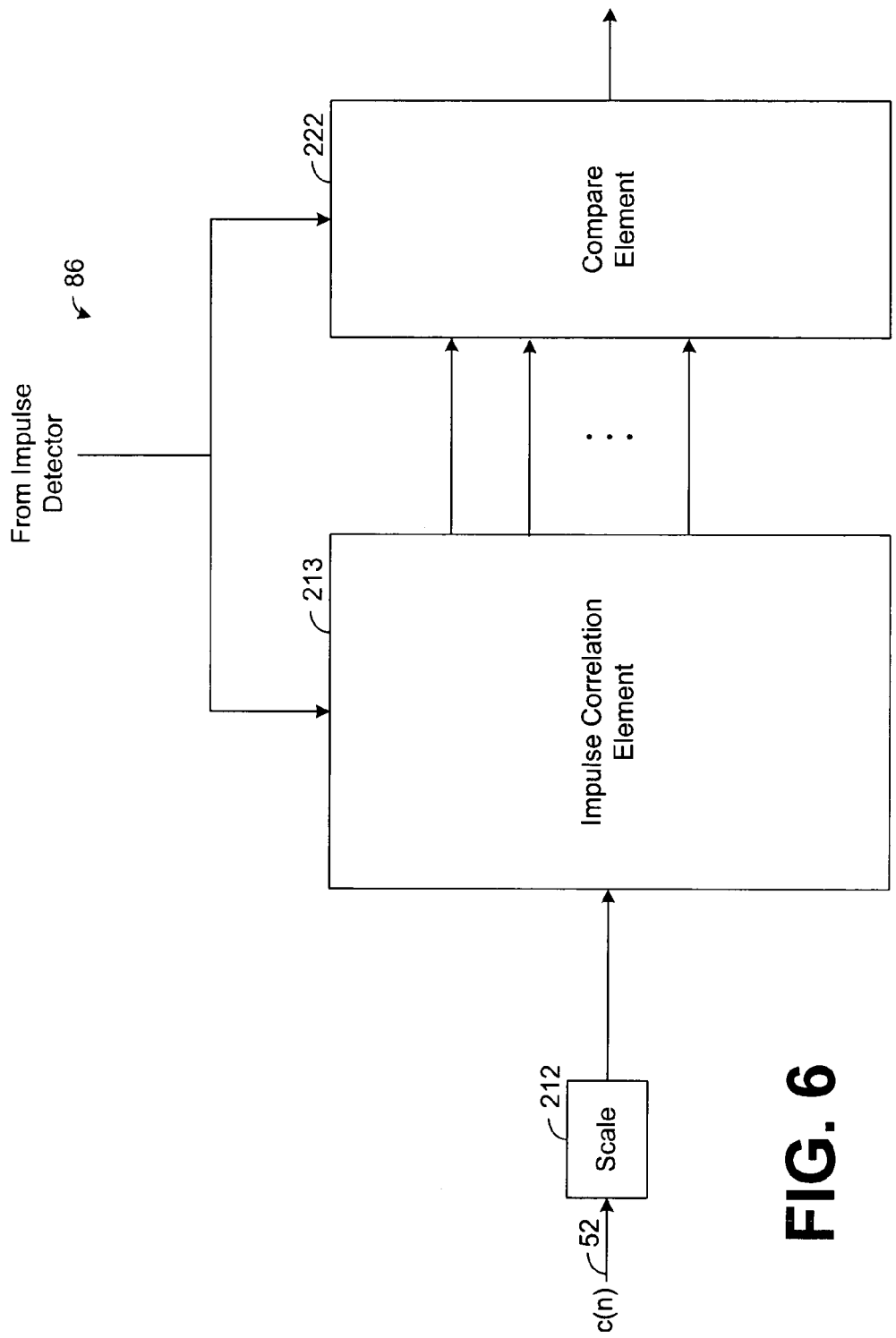
FIG. 6 is a block diagram illustrating an exemplary embodiment of an impulse identification element depicted in FIG. 3.

FIG. 6 depicts a more detailed view of the impulse identification element 86 of the impulse canceler 55. The common mode signal 52 received by the impulse canceler 55 is scaled by a scale element 212 before being input to an impulse correlation element 213. The impulse correlation element 213 stores data defining a plurality of noise impulses and compares such data to the received impulse. Based on such comparisons, the element 213 outputs data indicative of which of the stored impulses most closely resembles the detected impulse. As long as the degree or amount of resemblance is sufficiently high, a compare element 222 analyzes the output of the element 213 to identify the detected noise impulse. In this regard, the compare element 222 identifies which of the stored impulses most closely resembles the detected impulse.

Figure 7:
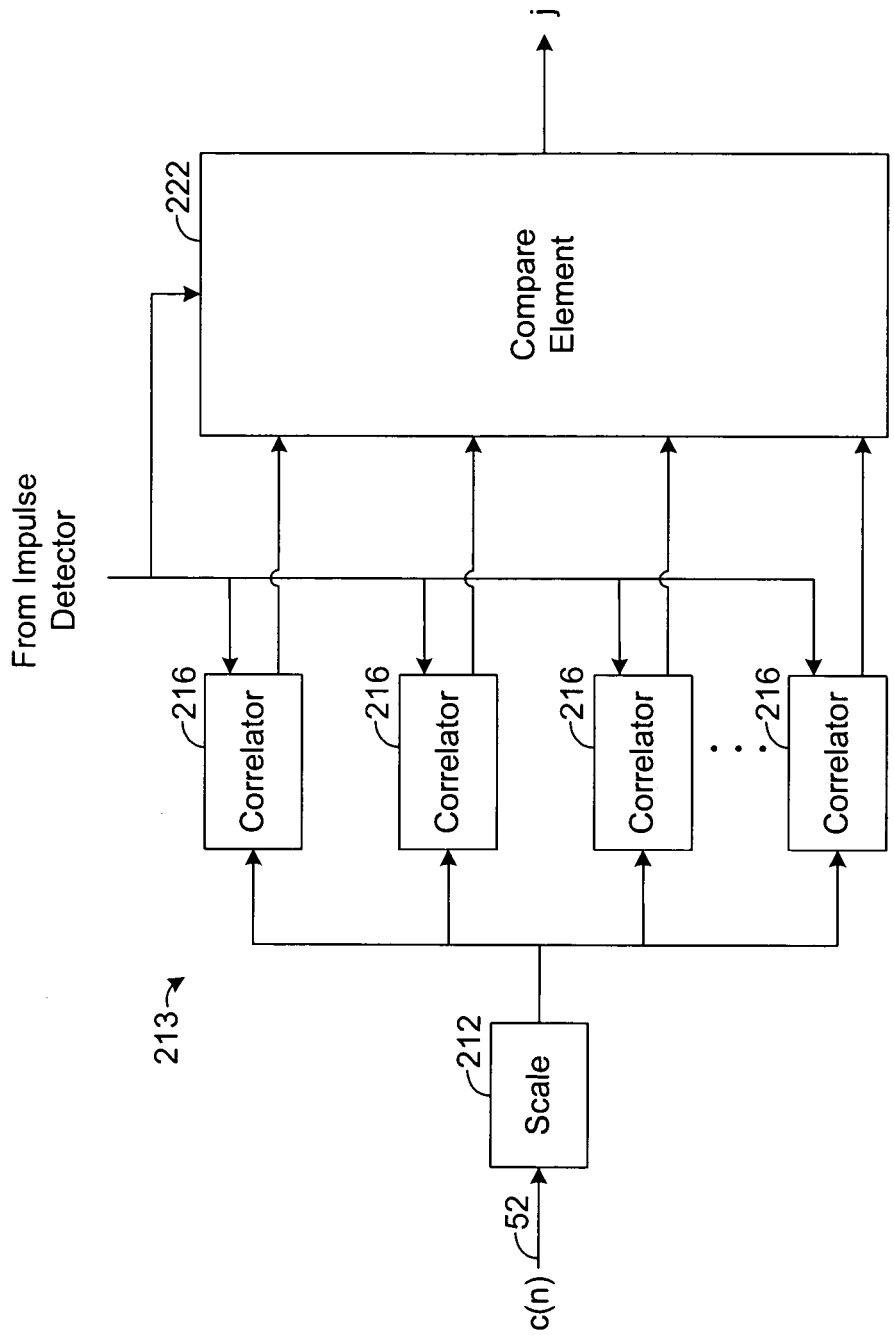
FIG. 7 is a block diagram illustrating an exemplary embodiment of an impulse correlation element depicted in FIG. 6.

Various technologies and methodologies may be used by the impulse correlation element 213 and compare element 222 to identify the detected impulse. In one embodiment shown by FIG. 7, the impulse correlation element 213 comprises a bank of correlators 216. Each of the correlators 216 is configured to store data defining a different noise impulse. In response to an impulse detection by the detector 83 (FIG. 3), each correlator 216 compares the detected impulse to the data defining its respective stored impulse and outputs one or more values indicative of the amount of correlation between the detected impulse and the stored impulse. For example, in one embodiment, a higher correlation value output by a correlator 216 indicates that a higher degree or amount of correlation exists between the detected impulse and the stored impulse. Thus, the correlator 216 that provides the highest correlation value in response to a detected impulse is storing the noise impulse that most closely resembles the detected impulse.

Various types of correlators 216 may be used to implement the impulse correlation element 213. In one exemplary embodiment, each correlator 216 is implemented as a matched filter, which uses a time-reversed version of a stored impulse in order to generate an output indicative of the amount of correlation between the stored impulse and the detected impulse. The functionality and operation of a matched filter for detecting the amount of correlation between a stored signal, as defined by a set of stored coefficients, and a received signal is generally well-known in the art and, therefore, will not be discussed in detail herein. Note that other types of correlators may be implemented in other embodiments.

For each impulse detected by the impulse detector 83 (FIG. 3), the compare element 222 determines which of the correlators 216 provides the highest or maximum correlation value, referred to as max_z. Note that such a correlator 216 is storing the impulse that most closely resembles the detected impulse from signal 52 as compared to the other impulses stored in the other correlators 216. If the maximum correlation value is above a specified threshold, ZTHD, then the compare element 222 determines that the detected impulse substantially matches one of the impulses stored in the correlators 216. In particular, the compare element 222 determines that the detected impulse substantially matches the impulse stored in the correlator 216 that transmitted the maximum correlation value, max_z. In such a case, the compare element 222 outputs a correlator identifiers, j, that identifies the foregoing correlator 216 and, therefore, the stored impulse substantially matching the detected impulse.

If, on the other hand, the maximum correlation value, max_z, is below the specified threshold, ZTHD, then the compare element 222 determines that the detected impulse does not match any of the impulses stored in any of the correlators 216. In such a case, the compare element 222 replaces the impulse stored in one of the correlators 216 with data defining the detected impulse such that if the same impulse is again received by the impulse identification element 86, the impulse would match the impulse stored in the one correlator 216. In this regard, for each of the correlators 216, the compare element 222 preferably counts the number of times that the impulse stored within the correlator 216 matches a detected impulse from signal 52 over a period of time. The value indicating such count for a respective correlator 216 will be referred to hereafter as the correlator's "match rate count."

The correlator 216 having the lowest match rate count is selected, by the compare element 222, for impulse replacement when the maximum correlation value, max_z, is below ZTHD, as described above. Further, when the impulse previously stored in a correlator 216 is replaced with the detected impulse, the match rate count associated with the correlator 216 is reinitialized to zero. Thus, when the maximum correlation value, max_z, for a detected impulse is below the specified threshold, ZTHD, the detected impulse replaces the impulse stored in the correlator 216 that has generated the fewest number of impulse matches. Therefore, over time, the correlators 216 are updated such that the most frequently encountered impulses are stored in the correlators 216.

Figure 8:
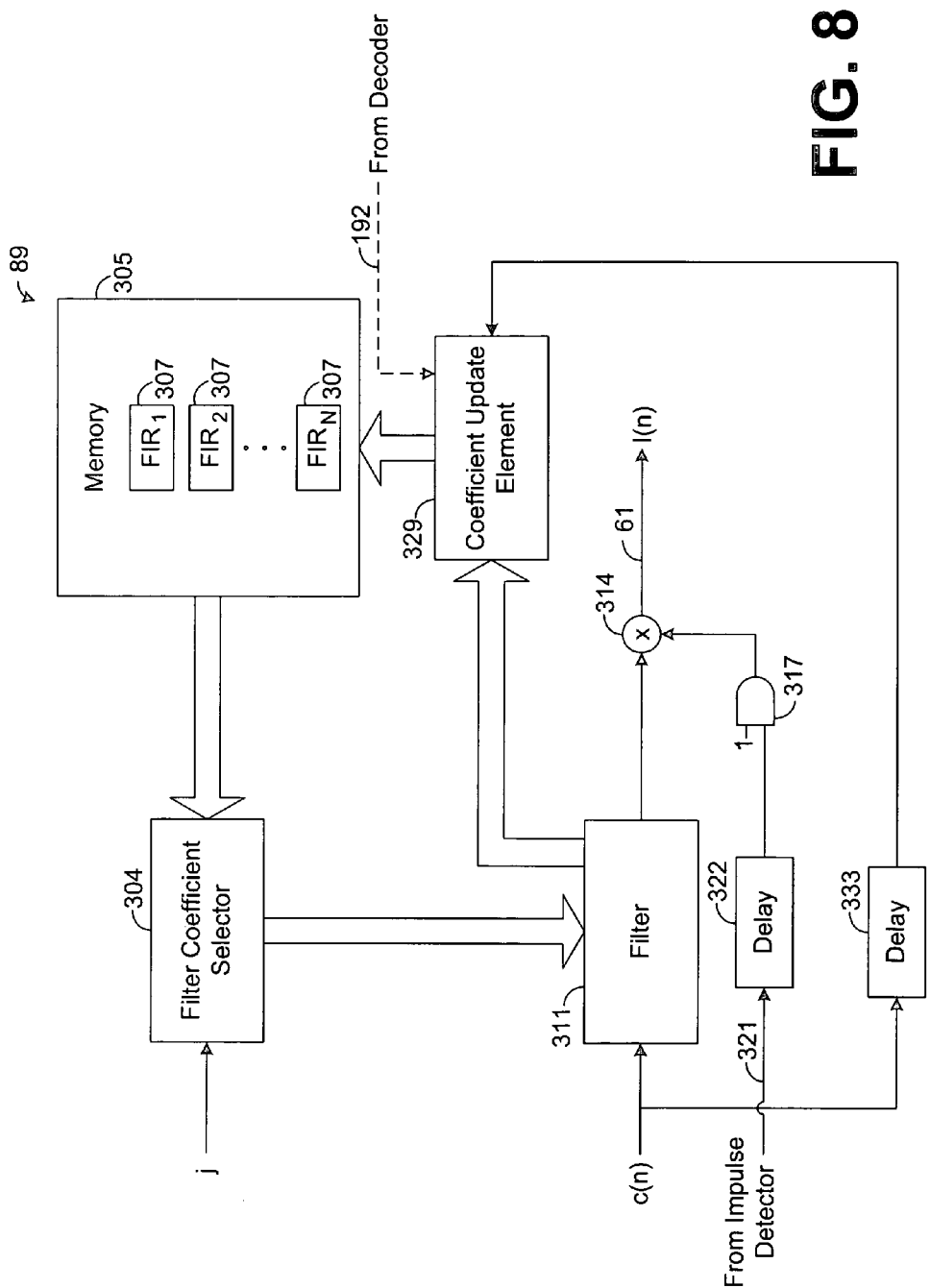
FIG. 8 is a block diagram illustrating an exemplary embodiment of an impulse estimator depicted in FIG. 3.

FIG. 8 depicts a more detailed view of the impulse estimator 89. As shown by FIG. 8, the impulse estimator 89 comprises a filter coefficient selector 304 and memory 305 storing sets ($FIR_1$, $FIR_2$, ... $FIR_N$) of filter coefficients 307. Each set of filter coefficients 307 corresponds to a respective one of the correlators 216 and provides a transfer function from common mode to differential mode of the impulse stored in the corresponding correlator 216. When the filter coefficient selector 304 receives a correlator identifier, j, from the compare element 222 (FIG. 7), the selector 304 selects the set of filter coefficients 307 corresponding to the identified correlator 216. As described above, the identified correlator 216 is storing the impulse that most closely matches the current detected impulse of signal 52. The selector 304 provides the selected set of coefficients 307 to filter 311, and this filter 311 uses such coefficients 307 to filter the detected impulse, which has been delayed by delay mechanism 94 (FIG. 3). The filtering by the filter 311 converts the impulse from common mode to differential mode such that the signal 61 output by the filter 311 represents an estimate of the detected impulse in the differential mode. This signal 61 is then subtracted from the differential mode component 49 (FIG. 2) of the same signal 38 that produced the impulse detected by detector 83 in order to remove the noise impulse from the differential mode component 49.

To better illustrate the foregoing, assume that receiver 29 (FIG. 2) receives a data signal 38 that includes a noise impulse. The impulse canceler 55 receives the common mode component of the signal 38. When the impulse detector 83 (FIG. 3) detects the noise impulse within the common mode component, the detector 83 notifies the impulse correlation element 213 (FIG. 7) and the compare element 222. In response, each of the correlators 216 compares the detected impulse to its respective stored impulse and outputs one or more correlation values indicative of such comparison.

The compare element 222, based on the correlation values output by the correlators 216, provides a correlator identifier, j, that identifies the detected impulse by identifying the correlator 216 storing the impulse that most closely resembles the detected impulse. Based on the correlator identifier, j, the filter coefficient selector 304 (FIG. 8) selects the set of coefficients 307 corresponding to the identified correlator 216 and transmits this set of coefficients 307 to the filter 311. Such coefficients 307 provide a transfer function for converting the detected impulse from common mode to differential mode. Thus, using the selected coefficients 307, the filter 311 filters the detected impulse thereby outputting an estimate of the impulse in the differential mode component of the same signal 38. By subtracting the signal output by the filter 311 from the signal 49 (FIG. 4), the noise impulse is substantially removed from the differential mode component.

Note that the impulse estimator 89 comprises a combiner 314 that normally multiplies a zero (0) to the output of the filter 311 but multiplies a one (1) when the filter 311 is filtering a detected noise impulse. To achieve the foregoing, the combiner 314 may multiply the output of the filter 311 by the output of an AND gate 317, which receives a value of one (1) and an enable signal 321 as input. The enable signal 321 is asserted by the impulse detector 83 when it detects a noise impulse. A delay mechanism 322 delays the signal 321 such that it is asserted only when a detected impulse is being received by the filter 311. To achieve the foregoing in one embodiment, the delay introduced by the delay mechanism 322 is equal to the delay introduced by the delay mechanism 94 (FIG. 3). Accordingly, the combiner 314 ensures that the impulse canceler 55 does not affect the signal 63 (FIG. 4) except when an estimate of a noise impulse is being generated.

In addition, the impulse estimator 89 of FIG. 8 is preferably configured to adaptively update the coefficients 307 used to generate a differential mode estimate of the detected impulse. In this regard, once a set of coefficients 307 is used to generate a differential mode estimate that is subtracted from signal 49 (FIG. 4) to produce an impulse-free signal 63, the decoder 184 generates a feedback signal 192 indicative of the decoder error detected for the impulse-free signal 63. Based on this feedback signal 192 and the detected impulse of signal 52, a coefficient update element 329 adaptively updates the foregoing set of coefficients 307. In one embodiment, a least mean squares (LMS) update algorithm is used to update the set of coefficients, although other types of algorithms for adaptively updating filter coefficients may be used in other embodiments. Note that, as shown by FIG. 8, a delay mechanism 333 preferably delays the detected common mode impulse such that the impulse and its corresponding decoder error are received by the coefficient update element 329 at the same time.

An exemplary methodology for canceling impulse noise will now be described in more detail with particular reference to FIG. 9.

Figure 9:
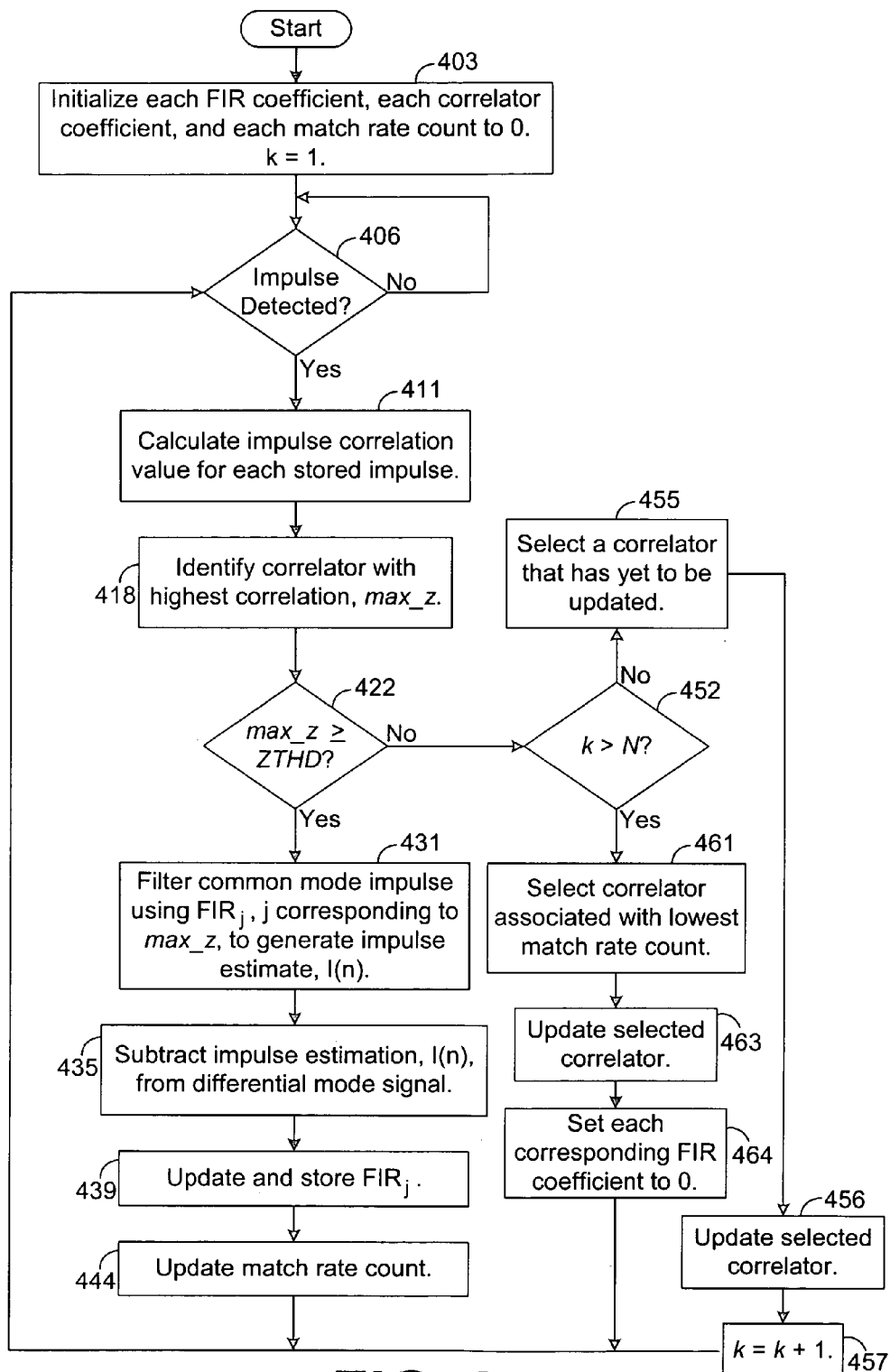
FIG. 9 is a flow chart illustrating an exemplary methodology for canceling impulse noise.

In this regard, each of the filter coefficients 307 (FIG. 8), as well as each of the coefficients of correlators 216 (FIG. 6), is initialized to zero (0), as indicated by block 403 of FIG. 9. Also shown by block 403, the match rate count for each correlator 216 is initialized to zero (0), and a value of a variable, k, is initialized to one (1). After initialization in block 403, the impulse detector 83 (FIG. 3) monitors the common mode signal 52 and eventually detects a noise impulse in block 406. Upon such a detection, the impulse detector 83 notifies correlators 216 (FIG. 7) and the compare element 222. In response, each of the correlators 216 compares the detected impulse to its respective stored impulse. Based on such comparison, each correlator 216, in block 411, calculates and outputs one or more correlation values indicative of the amount of correlation between the detected impulse and its respective stored impulse. In the instant example, a higher correlation value indicates a greater amount of correlation.

The compare element 222 compares the correlation values output from the correlators 216 and, in block 418, identifies the correlator 216 that outputs the highest correlation value, max_z, for the detected impulse. In block 422, the compare element 222 compares max_z to a threshold, ZTHD. If max_z exceeds ZTHD, then the compare element 222 determines that the detected impulse substantially matches the impulse stored in the correlator 216 that output max_z. In such an example, the compare element 222 transmits a correlator identifiers, j, that identifies the foregoing correlator 222. In response, the filter selector 304 (FIG. 8) retrieves the corresponding set of coefficients 307 and provides these coefficients 307 to the filter 311. The filter 311 then uses the foregoing coefficients 307 to filter the detected impulse thereby generating an estimation, I(n), of the detected impulse in the differential mode signal, as indicated by block 431.

In block 435, the impulse estimation, I(n), is subtracted from the differential mode signal 49 (FIG. 4) by the combiner 58 to remove impulse noise from the signal 49 thereby providing a signal 63 that is substantially free of impulse noise. The decoder 184 then decodes the signal 63 and provides a signal 192 indicative of the decoder error to coefficient update element 329 (FIG. 8). Based on this error, the coefficient update element 329 updates the previously described coefficients 307 used to filter the detected impulse, as indicated by block 439. Also, as shown by block 444, the match rate count of the correlator 216 (FIG. 7) that output max_z is incremented.

If, however, max_z does not exceed ZTHD in block 422, then none of the impulses stored in the correlators 216 substantially matched the detected impulse. In such an example, the compare element 222 replaces the stored impulse in one of the correlators 216 with data defining the detected impulse. In particular, as indicated by block 452, the compare element 222 compares k to N, which is equal to the total number of correlators 216. If k does not exceed N, then all of the correlators 216 have yet to be updated to store a sample impulse. In such an example, the compare element 222 selects, in block 455, one of the correlators 222 that has yet to be updated (i.e., one of the correlators 216 having coefficients still initialized to zero). The compare element 222, in block 456, then instructs the selected correlator 222 to update its stored coefficients. In response, the selected correlator 222 replaces its coefficients with coefficients defining the detected impulse. As shown by block 457, the value of k is then incremented.

Once a "yes" determination is made in block 452, all of the correlators 216 have been updated via an occurrence of block 456 such that each of the correlators 216 is storing a previously detected impulse. Thus, in response to a "yes" determination in block 452, the compare element 222 selects the correlator 216 associated with the lowest match rate count, as indicated by block 461. This correlator 216 is storing the impulse that has the fewest number of matches to detected impulses. If more than one of the correlators 216 has the lowest match rate count, then the compare element 222 can arbitrarily select one such correlator 216.

In block 463, the compare element 222 instructs the selected correlator 216 to update its stored coefficients thereby updating its stored impulse. In response, the selected correlator 216 replaces its coefficients with coefficients defining the detected impulse. The compare element 222 also notifies the filter selector 304 (FIG. 8) of the update to the selected correlator 216, and in block 464, the filter selector 304 reinitializes the filter coefficients 307 corresponding with the selected correlator 216 by setting each such coefficient 307 to a value of zero (0).

Figure 10:
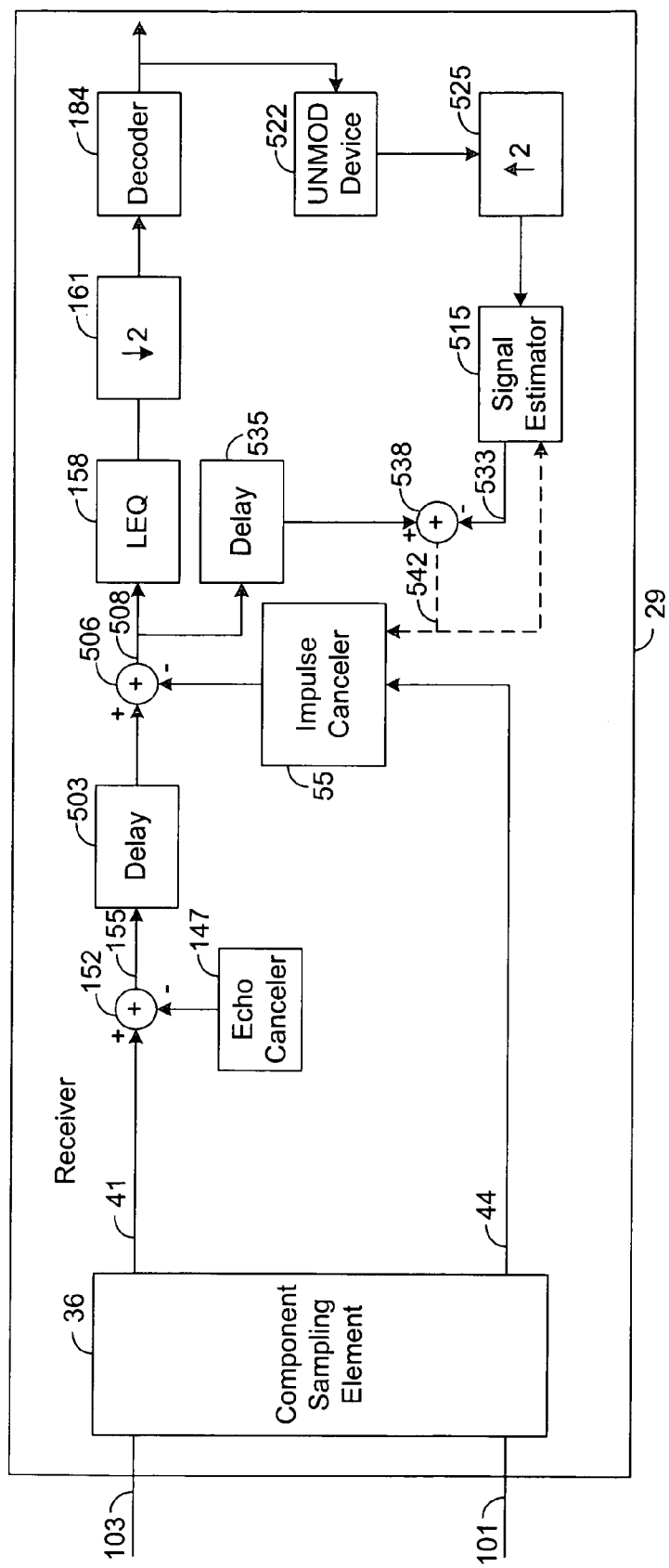
FIG. 10 is a block diagram illustrating another exemplary embodiment of the receiver depicted in FIGS. 1 and 2.

It should be noted that various modifications may be made to the embodiments described above without departing from the principles of the present disclosure. For example, FIG. 10 depicts an embodiment in which an impulse canceler 55 cancels noise impulses earlier in a receive path, as compared to the impulse canceler 55 depicted by FIG. 4. In this regard, the signal 155 output from combiner 152 is delayed by a delay mechanism 503 to provide the impulse canceler 55 with sufficient time to generate an impulse estimation for the signal 155 according to the techniques described above with respect to the impulse canceler of FIG. 4. A combiner 506 subtracts such impulse estimation from the delayed signal 155 to provide a signal 508 substantially free of impulse noise.

In the embodiment depicted by FIG. 10, a signal estimator 515 is used to provide a feedback signal for updating the impulse canceler 55 and/or other components of the receiver 29. In this regard, an inverse modulo device 522, also referred to as "UNMOD device," receives the decoded signal output by decoder 184 and performs an inverse modulo operation on this signal. The signal output from the inverse modulo device 522 is upsampled by optional upsample circuitry 525 before being provided to the signal estimator 515. The upsample circuitry 525 upsamples by the same rate that the circuitry 161, if present, downsamples signals. Based on the signal provided by the upsample circuitry 525, the signal estimator 515 outputs a signal 533, which is an estimate of the signal 508. Commonly assigned U.S. patent application Ser. No. 10/460,968, entitled "Echo-Canceler for Precoded Fractionally Spaced Receiver Using Signal Estimator," and filed on Jun. 13, 2003, which is incorporated herein by reference, describes the configuration and operation of the signal estimator 515 and various other components depicted in FIG. 10.

A delay mechanism 535 delays the signal 508 such that a combiner 538 subtracts the signal 508 from the signal's estimate provided by signal estimator 515 thereby producing a feedback signal 542. This feedback signal 542 may be used to update the signal estimator 515, the filter coefficients 307 (FIG. 8) of the impulse canceler 55, and possibly other components of the receiver 29. In this regard, in the embodiment depicted by FIG. 10, the coefficient update element 329 (FIG. 8) of the impulse canceler 55 uses the feedback signal 542, instead of the feedback signal 192 shown in FIG. 8, to update the filter coefficients 307.

Various other variations and modifications may be made to the above-described embodiments without departing substantially from the spirit and principles of the disclosure. All such modifications and variations are intended to be included herein within the scope of this disclosure and protected by the following claims.

Now, therefore, the following is claimed:

1. A communication apparatus, comprising:

an adaptive impulse canceler configured to receive a common mode component of a signal received from a telecommunication line and to detect a noise impulse in said common mode component, said impulse canceler configured to store sets of filter coefficients and data defining a plurality of impulse shapes, each of said impulse shapes associated with a respective one of said sets of filter coefficients that provides a transfer function for converting an impulse of the associated shape from common mode to differential mode, said impulse canceler configured to identify a shape of said noise impulse in said common mode component based on comparisons of said noise impulse in said common mode component to said data, said impulse canceler configured to select the set of filter coefficients associated with the identified shape for use in filtering said noise impulse in said common mode component, said impulse canceler having a filter configured to receive and filter said noise impulse in said common mode component based on the selected set of filter coefficients thereby providing an impulse noise estimation for a differential mode component of said received signal, wherein said selected set of filter coefficients controls a passband of said filter while said noise impulse in said common mode component is being filtered by said filter, wherein the filter, by filtering said noise impulse in said common mode component based on the selected set of filter coefficients, applies to said noise impulse in said common mode component a transfer function for converting an impulse of the identified shape from common mode to differential mode;

a combiner configured to receive said differential mode component and said impulse noise estimation and to combine said impulse noise estimation with said differential mode component thereby canceling impulse noise from said differential mode component;

a plurality of correlators storing said data, each of said correlators configured to provide a correlation value indicative of an amount of correlation between said detected noise impulse and a respective one of said impulse shapes; and a compare element configured to compare correlation values provided by said correlators and to identify said shape of said noise impulse in said common mode component based on said correlation values.

2. The apparatus of claim 1, wherein said impulse canceler is configured to update said selected set of filter coefficients based on an error associated with said differential mode component.

3. The apparatus of claim 1, wherein said correlators are updated based on impulses detected by said adaptive impulse canceler.

4. The apparatus of claim 1, wherein each of said correlators comprises a matched filter.

5. The apparatus of claim 1, wherein said impulse canceler comprises a coefficient update element configured to receive a feedback signal and to update said selected set of filter coefficients based on said feedback signal.

6. The apparatus of claim 1, wherein said impulse canceler is configured to learn, based on at least one impulse received from the telecommunication line, the transfer function applied to said noise impulse in said common mode component.

7. A communication apparatus, comprising:
an adaptive impulse canceler configured to receive a common mode component of a signal received from a telecommunication line and to detect a noise impulse in said common mode component, said impulse canceler configured to store sets of filter coefficients and data defining a plurality of impulse shapes, each of said impulse shapes associated with a respective one of said sets of filter coefficients, said impulse canceler configured to select one of said impulse shapes as corresponding to the noise impulse in said common mode component based on comparisons of said noise impulse in said common mode component to said data, said impulse canceler configured to select the set of filter coefficients associated with the selected impulse shape for use in filtering said noise impulse in said common mode component, said impulse canceler having a filter configured to receive and filter said noise impulse in said common mode component based on said selected set of filter coefficients, wherein said filter is configured to convert said noise impulse from common mode to differential mode, said impulse canceler further configured to determine a plurality of correlation values, each of said correlation values indicating an amount of similarity between a shape of said noise impulse in said common mode component and a respective one of said impulse shapes defined by said data, wherein said comparisons are based on said correlation values; and
a combiner configured to receive and combine a differential mode component of said received signal and said converted noise impulse.

8. A communication apparatus, comprising:
a sampling element configured to separate a signal received from a telecommunication line into a differential mode component and a common mode component;
an adaptive impulse canceler configured to detect a noise impulse within said common mode component and to filter said noise impulse thereby providing an estimation of said noise impulse in said differential mode component, said impulse canceler configured to store sets of filter coefficients and data defining a plurality of impulse shapes, each of said impulse shapes associated with a respective one of said sets of filter coefficients, said impulse canceler configured to select one of said sets of coefficients for use in filtering said noise impulse based on a degree of similarity between the noise impulse and the impulse shape associated with the one set of coefficients, wherein the filter, by filtering said noise impulse based on the one set of coefficients, applies to said noise impulse a transfer function for converting, from common mode to differential mode, an impulse of the impulse shape associated with the one set of coefficients, said impulse canceler further configured to determine a plurality of correlation values, each of said correlation values indicating an amount of similarity between a shape of said noise impulse and a respective one of said impulse shapes defined by said data, wherein said impulse canceler is configured to select said one set of coefficients for use in filtering said noise impulse based on comparisons of said correlation values; and
a combiner configured to combine said differential mode component and said estimation.

9. The apparatus of claim 8, wherein said impulse canceler is configured to learn the transfer function by filtering an impulse of the impulse shape associated with the one set of coefficients.

10. A method for adaptively canceling impulse noise, comprising the steps of:
receiving a signal from a telecommunication line;
detecting a noise impulse in a common mode component of the received signal;
storing, in memory, sets of filter coefficients and data defining a plurality of impulse shapes;
associating each of said impulse shapes with a respective one of said sets of filter coefficients;
comparing said noise impulse in said common mode component to said data;
identifying a shape of said noise impulse in said common mode component based on said comparing step;
selecting, based on said identifying step, the set of filter coefficients associated with the identified shape for use in filtering said noise impulse in said common mode component;
filtering said noise impulse in said common mode component via a filter based on said selecting step thereby providing an estimate of said noise impulse in said differential mode component, wherein the filtering step applies to said noise impulse in said common mode component a transfer function for converting an impulse of the identified shape from common mode to differential mode;
substantially canceling said noise impulse in said differential mode component based on said estimate; and
determining a plurality of correlation values, each of said correlation values indicating an amount of similarity between a shape of said noise impulse in said common mode component and a respective one of said impulse shapes defined by said data, wherein said comparing step is based on said correlation values.

11. The method of claim 10, wherein said canceling step comprises the step of subtracting said estimate from said differential mode component of said received signal.

12. The method of claim 10, further comprising the steps of:
estimating an error associated with said differential mode component; and
updating said selected set of filter coefficients based on said error.

13. A method for adaptively canceling impulse noise, comprising the steps of:
receiving a signal from a telecommunication line;
separating a differential mode component and a common mode component of said received signal;
detecting a noise impulse in said common mode component;

storing, in memory, sets of filter coefficients and data defining a plurality of impulse shapes;

associating each of said impulse shapes with a respective one of said sets of filter coefficients;

comparing said noise impulse in said common mode component to said data;

selecting one of said impulse shapes as corresponding to said noise impulse in said common mode component based on said comparing step;

selecting, for use in filtering said noise impulse in said common mode component, the set of filter coefficients associated with the selected impulse shape;

filtering said noise impulse in said common mode component via a filter based on the selected set of filter coefficients thereby converting said noise impulse in said common mode component to an impulse noise estimation for said differential mode component;

reducing impulse noise in said differential mode component based on said impulse noise estimation; and determining a plurality of correlation values, each of said correlation values indicating an amount of similarity between a shape of said noise impulse in said common mode component and a respective one of said impulse shapes defined by said data, wherein said step of selecting one of said impulse shapes as corresponding to said noise impulse in said common mode component is based on said correlation values.

14. The method of claim 13, wherein said reducing step comprises the step of subtracting said impulse noise estimation from said differential mode component.

15. The method of claim 13, further comprising the steps of:

estimating an error associated with said differential mode component; and updating said selected set of filter coefficients based on said error.

* * * * *